United States Patent
Luo et al.

(10) Patent No.: US 9,980,147 B2
(45) Date of Patent: May 22, 2018

(54) SPECTRUM MANAGER AND METHOD FOR ALLOCATING A SHARED FREQUENCY SPECTRUM TO OPERATORS IN A WIRELESS COMMUNICATION SYSTEM, AS WELL AS A CORRESPONDING BASE STATION

(71) Applicant: Huawei Technologies Duesseldorf GmbH, Dusseldorf (DE)

(72) Inventors: Jian Luo, Munich (DE); Josef Eichinger, Munich (DE)

(73) Assignee: Huawei Technologies Duesseldorf GMBH, Duesseldorf (DE)

( * ) Notice: Subject to any disclaimer, the term of this patent is extended or adjusted under 35 U.S.C. 154(b) by 57 days.

(21) Appl. No.: 15/276,487

(22) Filed: Sep. 26, 2016

(65) Prior Publication Data

US 2017/0013465 A1    Jan. 12, 2017

Related U.S. Application Data

(63) Continuation of application No. PCT/EP2014/056123, filed on Mar. 27, 2014.

(51) Int. Cl.
*H04W 72/00* (2009.01)
*H04W 16/06* (2009.01)
*H04W 16/14* (2009.01)
*H04W 24/02* (2009.01)
*H04W 72/04* (2009.01)

(52) U.S. Cl.
CPC .......... *H04W 16/06* (2013.01); *H04W 16/14* (2013.01); *H04W 24/02* (2013.01); *H04W 72/0453* (2013.01)

(58) Field of Classification Search
CPC ..................................................... H04W 16/06
USPC ........................................................ 455/454
See application file for complete search history.

(56) References Cited

FOREIGN PATENT DOCUMENTS

EP            2083590 A2       7/2009

OTHER PUBLICATIONS

A. Mihovska et al., "Multi-Operator Resource Sharing Scenario in the Context of IMT-Advanced Systems", Cognitive Radio and Advanced Spectrum Management, May 18, 2009, pp. 12-16.

*Primary Examiner* — Joel Ajayi

(57) ABSTRACT

A spectrum manager for allocating a shared frequency spectrum in a wireless communication system is disclosed. The wireless communication system comprises a plurality of base stations which are operated by at least two operators, said spectrum manager being configured to group the plurality of base stations into clusters based on spectrum demand related information; and determine a spectrum partition pattern for each cluster based on the spectrum demand related information and information of the grouped based station clusters, a spectrum partition pattern specifying the partition and allocation of frequency spectrum fragments to said at least two operators in a corresponding cluster, wherein a frequency spectrum fragment is allocated to only one of said at least two operators in each cluster, and forward information regarding the spectrum partition pattern to the plurality of base stations or to one or a plurality of network entities of the at least two operators.

11 Claims, 5 Drawing Sheets

SPECTRUM MANAGER AND METHOD FOR ALLOCATING A SHARED FREQUENCY SPECTRUM TO OPERATORS IN A WIRELESS COMMUNICATION SYSTEM, AS WELL AS A CORRESPONDING BASE STATION

CROSS-REFERENCE TO RELATED APPLICATIONS

This application is a continuation of International Application No. PCT/EP2014/056123, filed on Mar. 27, 2014, the disclosure of which is hereby incorporated by reference in its entirety.

TECHNICAL FIELD

The present invention refers to a spectrum manager and a method for allocating a shared frequency spectrum to operators in a wireless communication system, as well as to a corresponding base station.

BACKGROUND

Conventionally, the allocation of a frequency spectrum and the licensing to operators for mobile broad band (MBB) has been done in an exclusive manner, i.e. each operator obtains and licenses a fixed certain part of the frequency spectrum for exclusive usage. Such an exclusive frequency spectrum licensing and allocation has the advantages of a certain guarantee of quality of service (QoS), good interference management and a high degree of market certainty which was considered necessary to create adequate investment and innovation incentives. However, as the demand on mobile data traffic grows exponentially, the problem of "spectrum shortage" arises, i.e. there will be not enough spectrum bands or subcarriers, especially in the range below 6 Ghz, to be exclusively allocated and licensed to different operators. In other words, there is a need for more available frequency spectrum or a better usage of the currently available frequency spectrum. Even assumed that there is a sufficient amount of spectrum bands available in the available frequency spectrums for exclusive allocation, the mobile operators will face the pressure of a high spectrum cost. Such high costs for licensing and operation will become less and less acceptable. Furthermore, an exclusive allocation of frequency spectrum bands has the disadvantage of a low flexibility and low scalability, i.e. it often leads to an underutilization of the available resources in certain locations/regions and/or in certain periods of time. In other words, the efficiency of the usage of the available frequency spectrum is low. Thus, frequency spectrum sharing becomes a necessary and important tool to meet future spectrum requirements. On the one hand, mobile operators will have to share the available frequency spectrum with other communication or non-communication systems. On the other hand, mobile operators will have to share at least certain amounts, if not all, of the available frequency spectrum with each other. Actually, both sharing cases may occur simultaneously, for example, several operators may share a frequency band with a radar service in a primary/secondary manner, while they share the available frequency band with each other on an equal basis.

In the prior art, inter-operator spectrum sharing solutions normally work well only under ideal network deployment, e.g. all operators have collocated base stations, BSs, identical network deployment and homogenous Radio Access Network, RAN (same cell size everywhere). In practice, such ideal network deployment can only be found in delimited and special cases of RAN sharing. In a more general case, different operators have independent network deployments. Moreover, within the RAN of each operator, the cells would have various sizes and shapes in order to adapt to various network deployment environments or scenarios. For such realistic network deployment, the inter-operator spectrum sharing solutions of the prior art do not work well. Thus, a more efficient solution is required for realistic network deployment to allow a flexible spectrum sharing between operators.

In future wireless communication systems, a considerable part of the allocation of the available frequency spectrum will have to be done in a dynamic way and to sharing operators. This can for example be done under a licensed shared access, LSA, framework, where the frequency band of an incumbent user, for example a radar service, is temporarily licensed to multiple operators in a certain location and for a certain time period. Another example would be that the regulator licenses a spectrum band to multiple operators without fixed boundaries between the spectrum bands allocated to the different operators, so that the operators can coordinate their spectrum usage according to mutual agreement and/or specific or varying sharing rules. Irrespective of the scenario under which the spectrum is shared between operators, the key problem is the allocation of a certain available frequency spectrum band for shared usage to multiple, i.e. at least two operators. In an example of a previously suggested frequency spectrum sharing technique, Orthogonal Frequency-Division Multiplexing, OFDM, waveform is used, and fragments of the frequency spectrum, i.e. frequency subcarriers of the frequency spectrum, are allocated to the operators in an orthogonal manner. Orthogonal hereby and in the frame of the present application generally means that a specific subcarrier, or a specific group of subcarriers, or a frequency subband is only allocated to a specific operator, but not at the same time allocated to a different operator. At a given point of time, each frequency subcarrier or subband is therefore allocated to a specific operator, but not to two operators at the same time. The mutual interference between adjacent spectrum fragments consisting of subcarriers/subbands allocated to different operators can therefore be avoided by such orthogonal allocation of the resource blocks, i.e. subcarrier/subband fragments.

The present application and the technology underlying the invention, as later described, bases on partitioning of a shared frequency spectrum dynamically into frequency spectrum fragments and the allocation of the frequency spectrum fragments to the different operators. In order to minimize inter-operator or co-channel interference, different operators are allocated orthogonal sets of frequency spectrum fragments. The amount of allocated frequency spectrum for each operator should be adapted to the traffic demand of this operator, while taking the sharing policy into account, which is for example fairness or balance and so forth.

FIG. 1 shows an illustration for two cases in which the operators sharing the frequency spectrum have an ideal network deployment. Ideal network deployment is defined as a network deployment of different operators that is done in such a way that each sector or cell (in the shown example, each cell has 3 sectors of the same size) of one operator is only overlapping with only one sector or cell of another operator, respectively. A typical example is that cells of all operators have the same size and shape. FIG. 2 now shows two examples, an example 1 of non-co-located base stations 210, 220 and an example 2 of co-located base stations 210, 220. The base stations 210 belong to operator 1 (indicated by the solid lines of the cells around the base stations 210) and the base stations 220 belong to operator 2 (visualized by the broken lines of the cells around the respective base stations 220). In example 2, the base stations 210 and 220 are at the same location and the cells and sectors are co-located, i.e. are identically overlapping each other. In example 1, the base stations 210, 220 are non-co-located, but the respective sectors of each cell are identically co-located with respective sectors of an adjacent cell of the base station of the respectively different operator. Under such ideal network deployment and by ignoring inter-cell and inter-sector interference within each operator's network, each overlapping sector or cell contains the signals transmitted by one base station 210, 220 of each operator. Therefore, the spectrum partition pattern for each such overlapping sector or cell can be different and be handled independently. Here, the spectrum partition pattern is a pattern which defines the size and position of each frequency spectrum fragment as well as to which operator it is allocated. With each spectrum partition pattern, different operators are allocated orthogonal sets of spectrum fragments. Typically, the spectrum partition pattern of each such overlapping sector or cell is adapted to the traffic demand of each base station 210, 220 of each operator in a flexible manner.

In FIG. 2, an example of a realistic network deployment taking into consideration the co-channel interference is visualized. In a realistic implementation, the cells of the different base stations 210, 220 of the different operators have various and different sizes. Moreover, each sector or cell of one operator can be overlapping multiple sectors or cells of another operator. Under such realistic network deployment, if each sector or cell of one operator applies a different spectrum partition pattern, co-channel interference can occur, which means that in a certain overlapping area of the sectors or cells of different operators, a common spectrum fragment is used, causing inter-operator interference. Such co-channel interference is visualized in FIG. 2 by the fragment 2, which is used by both operators in an overlapping area of the sectors. Therefore, the user terminals using this fragment 2 in each of the overlapping sectors or cells can suffer from co-channel interference between operators.

SUMMARY

One object of the present invention is therefore to provide a technology for allocating a shared frequency spectrum to operators in a wireless communication system, which allows a flexible spectrum sharing between operators. Specifically, it provides a flexible adaption to the spectrum demands of the base stations while providing an efficient co-channel interference management at the same time.

The above object is achieved by the solution provided in the enclosed independent claims. Advantageous implementations are defined in the respective dependent claims.

A first aspect of the present invention provides a spectrum manager for allocating a shared frequency spectrum in a wireless communication system, said wireless communication system comprises a plurality of base stations for wireless communication with terminals, said plurality of base stations being operated by at least two operators, said spectrum manager being configured to group the plurality of base stations into clusters based on spectrum demand related information; and determine a spectrum partition pattern for each cluster based on the spectrum demand related information and information of the grouped based station clusters, a spectrum partition pattern specifying the partition and allocation of frequency spectrum fragments to said at least two operators in a corresponding cluster of said wireless communication system, wherein a frequency spectrum fragment is allocated to only one of said at least two operators in each cluster, and forward information regarding the spectrum partition pattern to the plurality of base stations or to one or a plurality of network entities of the at least two operators.

A frequency spectrum fragment is e.g. a contiguous frequency spectrum portion of said shared frequency spectrum. The network entities e.g. forward the mentioned information to base stations.

The present invention thus provides an efficient solution for realistic network deployment allowing flexible spectrum sharing between operators. Specifically, the present invention achieves a good tradeoff between flexible adaptation to spectrum demands of the base stations on the one hand and costs and efforts of co-channel interference management on the other hand.

In a first implementation form of the spectrum manager according to the first aspect of the present invention, the spectrum manager is further configured to dynamically group the plurality of base stations into clusters each time when the spectrum demand related information is updated, or group the plurality of base stations on demand of request from operators or base stations.

In a second implementation form of the spectrum manager according to the first aspect as such or the first implementation form of the first aspect of the present invention, the spectrum manager is further configured to receive spectrum demand related information from the plurality of based stations or from the network entities of the at least two operators, wherein the spectrum demand related information comprises information regarding the spectrum demand of each of the plurality of base stations and/or the network deployment information of the at least two operators.

In a third implementation form of the spectrum manager according to the first aspect as such or the first or second implementation forms of the first aspect of the present invention, the spectrum manager is further configured to classify the base stations of each cluster into inner base stations and edge base stations, inner base stations being base stations inside the respective cluster without being affected by co-channel interference, and edge base stations being base stations located in an edge area of the respective cluster being affected by co-channel interference, an edge area of a cluster being the area which overlaps with at least one edge area of a neighboring cluster. For example, the spectrum partition pattern for each cluster is hereby determined only based on the spectrum demand of each inner base station of the respective cluster without considering the co-channel interference. In addition, both the spectrum demand and the co-channel interference of each edge base station of the respective cluster can also be taken into account.

In a fourth implementation form of the spectrum manager according to the third implementation form of the first aspect of the present invention, the spectrum manager is further configured to group the base stations into a cluster by putting bases stations with a lower spectrum demand in the edge area of the cluster and base stations with a higher spectrum demand in the central area of the cluster.

In fifth implementation form of the spectrum manager according to the third or fourth implementation form of the first aspect of the present invention, the spectrum manager is further configured to categorize, for each edge base station, the frequency spectrum fragments, into different types of frequency spectrum fragments according to the spectrum partition patterns of all neighboring clusters of each edge base station, and wherein said different types of frequency spectrum fragments comprise a first type of frequency spectrum fragments which are used by the operator of the said edge base station in said neighboring clusters, a second type of frequency spectrum fragments which are used by different operators, including the operator of the concerned edge base station, in said neighboring clusters and a third type of frequency spectrum fragments which are not used by the operator of the said edge base station in said neighboring clusters.

In a sixth implementation form of the spectrum manager according to the fifth implementation form of the first aspect of the present invention, the spectrum manager is further configured to forward, to each edge base station, information about spectrum partition patterns allocated to all neighboring clusters of the respective edge base station in order to enable the edge base stations to classify the fragments of the allocated spectrum partition patterns into different types depending on the spectrum partition patterns allocated to the said neighboring clusters.

In a seventh implementation form of the spectrum manager according to the fifth or sixth implementation forms of the first aspect of the present invention for the second type of the frequency spectrum fragments a co-channel interference management is to be performed between the involved edge base stations.

In an eighth implementation form of the spectrum manager according to the sixth or seventh implementation forms of the first aspect of the present invention, the spectrum manager is further configured to partition frequency spectrum fragments of the second type into sub-fragments, and to allocate the different sub-fragments to the edge base stations of respective different operators.

A second aspect of the present invention provides a base station for wireless communication with terminals and a wireless communication system which comprises a spectrum manager according to the first aspect as such or according to any of the previous implementation forms of the first aspect and a plurality of base stations for wireless communication with terminals in said wireless communication system, wherein said base station is configured to receive information regarding said spectrum partition patterns from spectrum manager, and to communicate with terminals in said wireless communication system on the basis of said received information regarding said spectrum partition patterns. In addition, said base station may optionally be configured to receive said cluster related information. For example, an inner base station may only be configured to receive said spectrum partition pattern information, but not said cluster related information. An edge base station may e.g. be configured to receive both the spectrum partition pattern information as well as said cluster related information.

In a first implementation form of the base station of the second aspect of the present invention, the base station is an edge base station and is further configured to receive information about spectrum partition patterns allocated to neighboring clusters and categorize the fragments of the allocated spectrum partition patterns into different types depending on the spectrum partition patterns allocated to the neighboring clusters, wherein said different types comprise a first type of frequency spectrum fragments which are commonly used by the same operator of edge base station in neighboring clusters, a second type of frequency spectrum fragments which are used by different operators, including the operator of the concerned edge base station, in respective neighboring clusters and a third type of frequency spectrum fragments which are not used by the operator of the concerned edge base station in respective neighboring clusters.

In a second implementation form of the base station according to the first implementation form of the second aspect of the present invention, the base station is further configured to negotiate, with respective edge base stations of neighboring clusters, a usage plan for the second type of fragments which are used by different operators, including the operator of the concerned edge base station, in respective neighboring clusters.

In a third implementation form of the base station according to the first implementation form of the second aspect of the present invention, the base station is further configured to transmit, to respective edge base stations of neighboring clusters, its usage parameters for the second type of fragments, which are used by different operators, including the operator of the concerned edge base station, in respective neighboring clusters.

In a fourth implementation form of the base station according to the first implementation form of the second aspect of the present invention, the base station is further configured to let its allocated terminals determine co-channel interference in the second type of fragments, and to allocate resources in said second type of fragments only to terminals with low co-channel interference.

A third aspect of the present invention provides a method for allocating shared frequency spectrum to operators in a wireless communication system for wireless communication with terminals in said wireless communication system, said wireless communication system comprising a plurality of base stations being operated by at least two operators, comprising the steps of grouping said plurality of base stations into clusters on the basis of spectrum demand related information; and determining a spectrum partition pattern for each cluster based on the spectrum demand related information and information of the grouped based station clusters, a spectrum partition pattern specifying the partition and allocation of frequency spectrum fragments to said at least two operators in a corresponding cluster of said wireless communication system, wherein a frequency spectrum fragment is allocated to only one of said at least two operators within each cluster, and forwarding information regarding the spectrum partition pattern to the plurality of base stations or to one or a plurality of network entities of the at least two operators.

The method according to the third aspect of the present invention is advantageously performed by a spectrum manager of the first aspect or any of its implementation forms, which can for example be a control unit which is physically separate from said plurality of base stations, or which could comprise distributed functional control elements, which are respectively part of the plurality of base stations. These exemplary implementations also apply to the spectrum manager according to the first aspect and its various implementation forms described above.

A first implementation form of the method according to the third aspect, further comprises to dynamically group the plurality of base stations into clusters each time when the spectrum demand related information is updated, or group the plurality of base stations on demand of request from operators or base stations.

A second implementation form of the method according to the third aspect as such or to the first implementation form of the third aspect further comprises to receive spectrum demand related information from the plurality of based stations or from the network entities of the at least two operators, wherein the spectrum demand related information comprises information regarding the spectrum demand of each of the plurality of base stations and/or the network deployment information of the at least two operators.

A third implementation form of the method according to the third aspect as such or to the first of second implementation form of the third aspect further comprises to classify the base stations of each cluster into inner base stations and edge base stations, inner base stations being base stations inside the respective cluster without being affected by co-channel interference, and edge base stations being base stations located in an edge area of the respective cluster being affected by co-channel interference, an edge area of a cluster being the area which overlaps with at least one edge area of a neighboring cluster, and determine a spectrum partition pattern for each cluster.

A fourth implementation form of the method according to the third implementation form of the third aspect further comprises to group the base stations into a cluster by putting bases stations with a lower spectrum demand in the edge area of a cluster and base stations with a higher spectrum demand in the central area of the a cluster.

In a fifth implementation form of the method according to the third or fourth implementation form of the third aspect, further comprises to categorize, for each edge base station, the frequency spectrum fragments, into different types of frequency spectrum fragments according to the spectrum partition patterns of all neighboring clusters of each edge base station, and wherein said different types of frequency spectrum fragments comprise a first type of frequency spectrum fragments which are used by the operator of the said edge base station in said neighboring clusters, a second type of frequency spectrum fragments which are used by different operators, including the operator of the concerned edge base station, in said neighboring clusters and a third type of frequency spectrum fragments which are not used by the operator of the said edge base station in said neighboring clusters.

A sixth implementation form according to the method of the fifth implementation form of the third aspect further comprises to forward, to each edge base station, information about spectrum partition patterns allocated to all neighboring clusters of the respective edge base station in order to enable the edge base stations to classify the fragments of the allocated spectrum partition patterns into different types depending on the spectrum partition patterns allocated to the said neighboring clusters.

In a seventh implementation form of the method according to the fifth or sixth implementation forms of the third aspect for the second type of the frequency spectrum fragments a co-channel interference management is to be performed between the involved edge base stations.

An eighth implementation form of the method according to the sixth or seventh implementation forms of the third aspect further comprises to partition frequency spectrum fragments of the second type into sub-fragments, and to allocate the different sub-fragments to the edge base stations of respective different operators.

A fourth aspect of the present invention provides a method performed in a base station for wireless communication with terminals in a wireless communication system which comprises a spectrum manager according to the first aspect as such or any of the implementation forms of the first aspect, and a plurality of base stations for wireless communication with terminals in said wireless communication system, comprising the steps of receiving information regarding said spectrum partition patterns or optionally in addition, the said cluster related information from said spectrum manager, and communicating with terminals in said wireless communication system on the basis of said received information regarding said spectrum partition patterns or optionally in addition, the said received cluster related information.

In a first implementation form of the method according to the fourth aspect of the invention, said base station is an edge base station, and the method comprises to receive information about spectrum partition patterns allocated to neighboring clusters and categorize the fragments of the allocated spectrum partition patterns into different types depending on the spectrum partition patterns allocated to neighboring clusters, wherein said different types comprise a first type of frequency spectrum fragments which are commonly used by a same operator in neighboring clusters, a second type of frequency spectrum fragments which are used by different operators, including the operator of the concerned edge base station, in neighboring clusters and a third type of frequency spectrum fragments which are not used by any operator in neighboring clusters.

A second implementation form of the method according to the first implementation form of the fourth aspect further comprises to negotiate, with respective edge base stations of neighboring clusters, a usage plan for the second type of fragments which are used by different operators, including the operator of the concerned edge base station, in respective neighboring clusters.

A third implementation form of the method according to the first implementation form of the fourth aspect further comprises to transmit, to respective edge base stations of neighboring clusters, its usage parameters for the second type of fragments which are used by different operators, including the operator of the concerned edge base station, in respective neighboring clusters.

A fourth implementation form of the method according to the first implementation form of the fourth aspect comprises to let its allocated terminals determine co-channel interference in the second type of fragments, and to allocate resources in said second type of fragments only to terminals with low co-channel interference.

The above described first, second, third and fourth aspects of the invention solved the above described object in an advantageous way. Specifically, these aspects of the invention provide an efficient solution for flexible spectrum sharing between operators under realistic network deployment implementations. Also, the aspects of the invention provide a good tradeoff between flexible adaptation to spectrum demands of the base stations on the one side and the costs and efforts of co-channel interference management on the other side. It has to be understood that the spectrum manager according to the first aspect of the invention or its various implementations can be implemented in one or more control units which is or are physically separate from said plurality of base stations. Alternatively, the spectrum manager could comprise or even consist of distributed functional control elements which are respectively part and implemented in some or all of the plurality of base stations or intermediate network entities. The methods defined in the third aspect and the fourth aspect of the invention as well as their implementation forms could be combined to a method according to a fifth aspect of the invention, which comprises respective steps performed in or by a spectrum manager as defined, as well as corresponding steps performed in or by a base station or several base stations as defined. Further advantageous but optional implementation forms are defined in the various above described implementation forms.

The present invention specifically provides a technical framework and a technical solution enabling at least two operators to share an available frequency spectrum in a wireless communication system, while allowing the operators to manage their mutual interference while still achieving a high efficiency of spectrum usage and still providing flexibility to adapt the spectrum partition and allocation to the spectrum demands of the base stations. The present invention provides a particularly advantageous solution even if the different operators do not have ideal network deployment. Further, the present invention supports inter-operator frequency spectrum sharing in all possible sharing scenarios, including but not limited to mutual renting, spectrum spot market, co-primary sharing, licensed shared access, LSA, secondary horizontal sharing, unlicensed sharing and so forth. The present invention supports cases with and without ideal network deployments of the operators or RAN sharing. It also supports a mixture of both, i.e. if a part of the operators of the communication system have ideal network deployment or RAN sharing, while the other part of operators has not.

It is to be noted that the wireless communication system in which the present invention works and is implemented could be based on any kind of present or future system comprising a plurality of frequency subcarriers or subbands which span a certain frequency spectrum band. The frequency subcarriers or subbands could have a constant width and spacing, or could have a flexible and adaptive width and spacing. The wireless communication system could e.g. be any kind of past, present or future multi-carrier or multi-band communication system. Possible but not limiting implementations of a multi-carrier system could be based on filter bank based multi carriers, FBMC, generalized frequency division multiplexing, GFDM, wave forms and so forth. A further possible but not limiting requirement on the multi carriers could be a low radiation outside of the fragments and thus a low inter-operator inference and/or low guard band overhead and/or high spectrum usage efficiency. Also, the communication system of the present invention may be, but does not have to be, backwards compatible with existing wireless communication systems, such as orthogonal frequency division multiplexing, OFDM, systems, UMTS systems, GSM systems etc.

Generally, the wireless communication system of the present invention, which comprises a central control means and at least two base stations as defined, could be defined for any geographical size, for example in a cell as in a traditional cellular wireless communication system, a larger region or even a country.

The term base station as used and defined throughout the present application is a physically separate entity which is adapted to wirelessly exchange signaling and content data with terminals allocated to the base station. An operator is a legal entity responsible for operating one or more base stations. In the frame of the present application, two or more operators could use one base station in a shared manner to communicate with the respective terminals of their users via this base station. Also, alternatively and additionally, a base station could belong to only a single operator. It has to be noted, that, throughout the present application, the description of functionalities, features, characteristics and so forth of an operator or operators refers to the respective entities in which these functionalities, features, characteristics and so forth are implemented. For example, interference between different operators to which adjacent fragments are allocated may refer to interference caused between a first and a second base station which belong to different operators. Additional or alternative operator functionalities could be implemented in or allocated to other physical or functional entities of the core network. The term terminal refers to terminal devices used by users which are allocated to and have contracts with the respective operators. Such terminals may include but are not limited to cell phones, wireless phones, personal digital assistants, tablets, photo computers of any kind, and so forth.

One advantageous feature of the present invention is that, at a given point in time and within a certain geographic area, one fragment is only allocated to one operator, but not to another operator of the wireless communication system. In other words, a fragment allocated to one operator does not overlap with another fragment allocated to a different operator at any given point in time. However, since the allocation of fragments to operators according to the present invention is flexible and can vary in time, one fragment or parts of a fragment allocated to one operator at one time point can be allocated to a different operator at another time point.

Further, it has to be noted that the shared frequency spectrum consisting of the plurality of frequency subcarriers or frequency subbands can be a contiguous or non-contiguous frequency spectrum. This means that the frequency spectrum, from which fragments in the form of at least one respective subcarrier or subband are allocated to respective operators, can consist of a plurality of subcarriers or subbands which are respectively adjacent to each other, or can consist of different parts of the frequency spectrum which are not immediately adjacent but distant from each other, wherein the other parts could be allocated to other services, for example public services or the like. Also, in the frame of the present invention, one or more fragments of the frequency spectrum could be allocated to a single operator, wherein these allocated fragments are not necessarily immediately adjacent to each other, but could be spaced apart within the frequency spectrum.

It is further to be noted that the spectrum partition pattern, which is determined by the central control means can be flexibly determined regularly in time or irregularly depending on the occurrence of certain conditions or situations. This allows a very flexible and efficient use of the available frequency spectrum.

It has to be noted that all devices, elements, units and means described in the present application could be implemented by software or hardware elements or any kind of combination thereof. All steps which are performed by the various entities described in the present application as well as the functionality described to be performed by the various entities are intended to mean that the respective entity is adapted to or configured to perform the respective steps and functionalities. Even if in the following description of specific embodiments, a specific functionality or step to be performed by a general entity is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above aspects and implementations of the present invention will be explained in the following description of specific embodiments in relation to the enclosed drawings, in which.

DETAILED DESCRIPTION

As discussed above embodiments of the present invention refers to a spectrum manager 300 for allocating a shared frequency spectrum in a wireless communication system, as well as a to base station 310, 320 for wireless communication with terminals in a wireless communication system, which comprises a spectrum manager 300 according to the invention and plurality of base stations 310, 320, as well as to corresponding methods performed in or by the spectrum manager 300 and in or by the base station 310, 320 of the invention, as well as to a corresponding wireless communication system comprising a spectrum manager 300 as well as a plurality of base stations 310, 320 according to the invention and a corresponding communication method.

Figure 1:
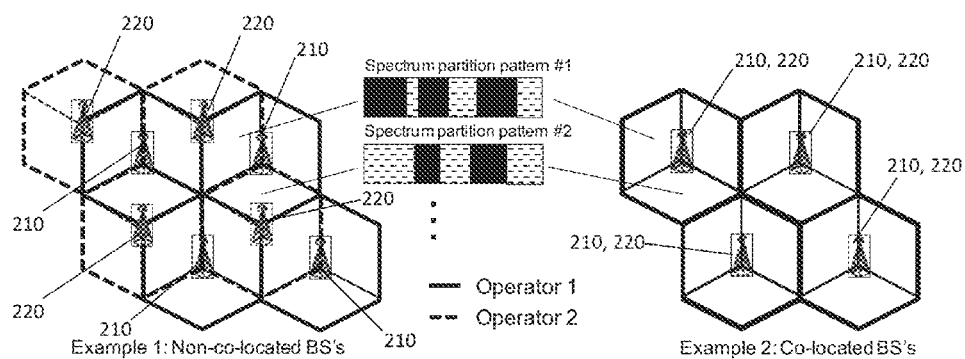
FIG. 1 shows an illustration of an ideal network deployment and a per-sector adaption of a spectrum partition pattern known from the prior art.
Figure 2:
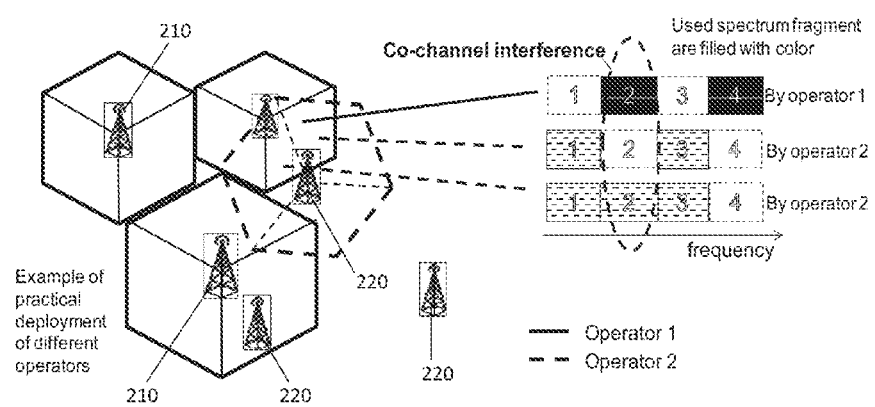
FIG. 2 shows an illustration of a realistic network deployment and co-channel interference caused by per-sector adaption of the spectrum partition pattern.
Figure 3:
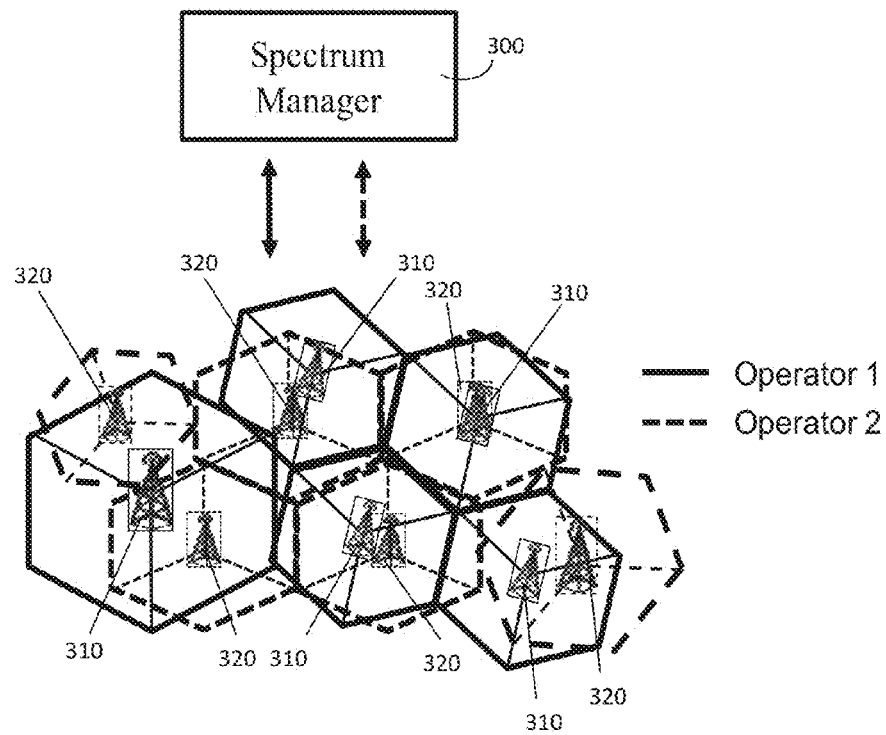
FIG. 3 shows an illustration of an example of frequency spectrum sharing as suggested by embodiments of the present invention.

FIG. 3 shows an illustration of a spectrum manager 300 according to an embodiment of the invention and the method of dynamic sharing of a frequency spectrum by two operators, operator 1 and operator 2. However, this invention also applies to cases with more than two operators. The base stations 310 allocated to operator 1 are shown with solid line cells around the base stations 310 and the base stations 320 allocated to operator 2 are shown with interrupted line cells around the base stations 320. In the shown example, each cell allocated to each base station 310, 320 is sub-divided into three sectors of equal size for simplicity. Furthermore, the cells allocated to the base stations 310, 320 in the invention can have different sizes and shapes. According to the invention, the spectrum sharing is coordinated by the spectrum manager 300, which partitions the shared spectrum into frequency spectrum fragments and allocates the frequency spectrum fragments to the corresponding operators. The partitioning and allocation of the shared frequency spectrum can be different for different base stations 310, 320, i.e. the spectrum partition pattern can be different for different base stations 310, 320. The spectrum manager 300 is a common functional unit which is either owned by the operators 1, 2 or by a third party. The spectrum manager 300 either communicates directly with the base stations 310, 320 or via one or more intermediate network entities, such as for example a Mobility Management Entity, MME. The network deployments of different operators 1, 2 are generally independent from each other. Within each operator's network, the cell sizes and shapes can vary. However, as a special case, a subset of the operators can have an ideal network deployment in a certain geographical area, so that each sector or cell of one operator is only overlapping with one sector or cell of another operator within this subset. Such an ideal network deployment is illustrated in FIG. 1, as example 2.

In the following, the base station clustering method and implementation according to the embodiments of the present invention are explained in more detail. Each operator provides the following information to the spectrum manager 300 on a regular basis or on demand by the involved network entities, namely the network deployment information and the spectrum demand related information of each base station 310, 320. The network deployment information comprises information used in the conventional network deployment planning, and comprises for example the location of the antennas of the base stations 310, 320, for example using the geographical coordinates, the transmit power of each base station 310, 320, the antenna characteristics, cell sizes, cell shapes, coverage range, etc. The information related to the spectrum demand of each base station 310, 320 comprises for example information of the traffic demand. It is to be noted that the above mentioned spectrum demand is only related to the considered shared frequency spectrum band. The dedicated license spectrum bands, the ones dedicated to a certain operator, are generally not taken into account. Generally, the above mentioned spectrum demand related information can be sent by the base stations 310, 320 to the spectrum manager 300 either directly, or as mentioned, via intermediate network entities. If a part of such information is static, for example, as a major part of the network deployment information, it can also be pre-stored in the spectrum manager 300. Only the changing part of such information needs to be sent to the spectrum manager 300 on a regular basis or on demand by the involved network entities.

After collecting the above mentioned information from the base stations or intermediate network entities of the corresponding operators, the spectrum manager 300 first checks whether a subset of the operators have an ideal network deployment in a certain geographical area. The ideal network deployment means that the network deployment of different operators is done in such a way that each sector or cell of one operator is only overlapping with only one sector or cell of another operator, respectively. Such checking can be done by comparing the deployment information provided from different operators. Alternatively, operators having ideal network deployment, for example operators with a shared Random Access Network, RAN, can send a corresponding information regarding the geographic areas of the ideal deployment networks to the spectrum manager 300 either via the base stations 310, 320 or via intermediate network entities like the MMEs, in order to indicate the geographic area in which they have the ideal network deployment. If a subset of the operators has ideal network deployment in a geographic area, such operators are grouped together as a big virtual operator in this geographic area. Such a virtual operator comprising a subset of operations having ideal network deployment in a geographic area is then treated in the same manner as the other individual operators having respective realistic network deployments. A realistic network deployment means that different operators have independent network deployments in one geographic area. For example, with realistic network deployment and within the radio access domain of each operator, the cells would have various sizes and shapes in order to adapt to various network deployment environments or scenarios. In the frame of the present invention, the term operators refer to a virtual operator as above defined, an operator having realistic network deployment and the both. The spectrum allocation within the subgroup of operators having an ideal network deployment will be described further below.

Figure 4:
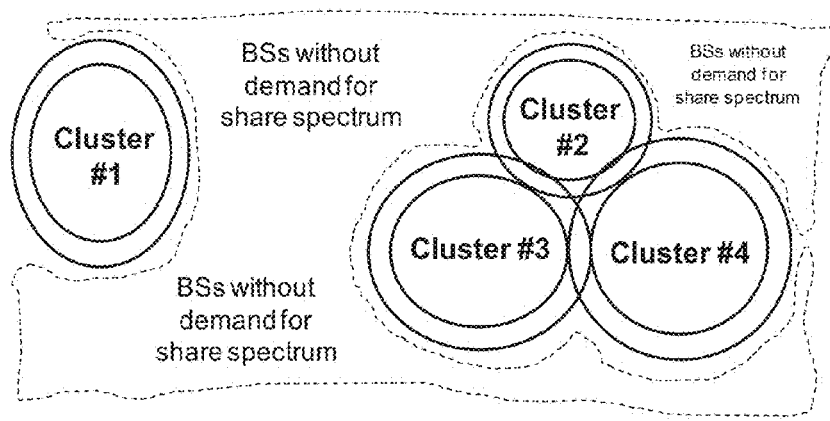
FIG. 4 shows an illustration of a clustering of base stations as suggested by embodiments of the present invention.

Basing on the spectrum demand related information sent by each base station 310, 320 or by an intermediate network entities, the spectrum manager 300 groups neighboring base stations 310, 320 of the different operators into clusters. The size of each cluster can vary, preferably comprises more than one base station 310, 320 per operator and is geographically smaller than a city of normal size or a large geographical district. Furthermore, the clusters are dynamic, i.e., the clusters can include different base stations 310, 320 in different cycles and periods of the frequency spectrum partition and allocation. Such a grouping operation is done by the spectrum manager 300 regularly or on demand, so that the clusters can be adapted to the changes of the spectrum demands of the base stations 310, 320. When grouping base stations 310, 320 into clusters, the spectrum manager 300 optimizes the clustering taking the following factors into account. 1) Within each cluster, the base station 310, 320 of a certain operator should have a similar spectrum demand. This means that the spectrum demand of each individual base station 310, 320 of this operator in this cluster should not have a too large difference to the average spectrum demand of the base stations 310, 320 of this operator of this cluster, the large difference here can mean e.g. 80% of the said average spectrum demand. In other words, the number of base stations 310, 320 with spectrum demands that deviate significantly from the average spectrum demand should be small, e.g. smaller than 5% compared to the total number of base stations 310, 320 of this operator within this cluster. FIG. 4 shows an example of clustering of base stations into four clusters, wherein cluster 1 does not overlap with any other clusters, but clusters 2, 3, 4 overlap partially at their edge regions. Also, as visualized in FIG. 4, there are base stations which are not clustered since they do not have any demand for a shared frequency spectrum.

Generally, base stations 310, 320 with a low spectrum demand, e.g., can be put at the edge of a respective cluster. Hereby, low demand on a shared spectrum means that the spectrum demand of the base station 310, 320 for the edge area should be much lower than, for example less than half of, the average spectrum demands of the respective base stations 310, 320 in the center area of the cluster. It can happen that in the surrounding of the cluster, the base stations of all concerned operators have no demand on the shared frequency spectrum. Such base stations are not grouped into clusters, i.e. are not considered for the spectrum sharing procedure by the spectrum manager 300, as shown in FIG. 4.

Figure 5:
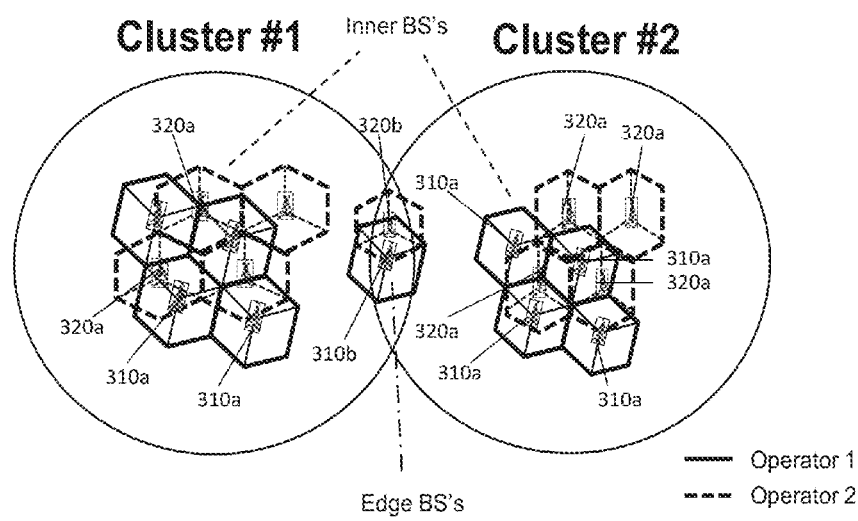
FIG. 5 shows an illustration of the clustering of base stations as suggested by embodiments of the present invention with inner base stations and edge base stations.

After the clustering, the spectrum manager 300 categorizes the base stations 310, 320 in each cluster into the following two clusters, as visualized in FIG. 5, namely inner base stations 310a, 320a and edge base stations 310b, 320b. The inner base stations 310a, 320a are the base stations within the central areas of the concerned clusters (central areas are relative to the concerned cell size and shape, which is determined based on the co-channel interference situation), which are not affected by co-channel interference, when they deploy the spectrum partition pattern which is determined by the spectrum manager 300. The edge base stations 310b, 320b are the base stations located at the edge of the respective cluster which are in or near an overlapping area of the two neighboring clusters. Such edge base stations 310b, 320b, can be affected by co-channel interference and accordingly, the co-channel interference has to be managed, when they deploy the spectrum partition pattern, which is determined by the spectrum manager 300.

For each cluster, the spectrum manager 300 determines a spectrum partition pattern, which specifies the partitioning and allocation of the shared frequency spectrum. An individual spectrum partition pattern is allocated to each individual cluster. Different clusters can have different spectrum partition patterns. The determination of the spectrum partition pattern of each cluster should firstly take the demands of each inner base station 310a, 320a in this cluster, as for example the traffic demand or spectrum demand, into account. One example is that the allocated demand of the shared frequency spectrum to each operator in a certain cluster is proportional to the average spectrum demand of the inner base stations 310, 320 of this operator within the cluster. In addition, the spectrum demand and the co-channel interference of the edge base stations can also be taken into account, but not necessarily.

The spectrum manager 300 informs each base station 310, 320 about its class, i.e., whether it is an inner base station 310a, 320a or an edge base station 310b, 320b, by sending corresponding information to each base station 310, 320 directly, or via intermediate network entities, which then forwards such information to the respective base stations 310, 320 e.g., through the S1 interface or through common control signaling channel. Such information can be named as "Base Station Class Indicator" and can for example have just one bit, with "0" meaning "inner base station" and "1" meaning "edge base station". More details about the signaling between the spectrum manager 300 and the base stations 310, 320 will be given further below. For the inner base stations 310a, 320a the spectrum manager 300 further informs them about the determined spectrum partition pattern. Hereby, each base station can receive information about the entire spectrum partition pattern, or only the information regarding the frequency spectrum fragments which are allocated to the respective base stations. Each inner base station 310a, 320a can implement such an allocated spectrum partition pattern specified by the received information about the entire spectrum partition pattern or specified by the received information regarding the frequency spectrum fragments allocated only to itself directly without being concerned about co-channel interference management.

Figure 6:
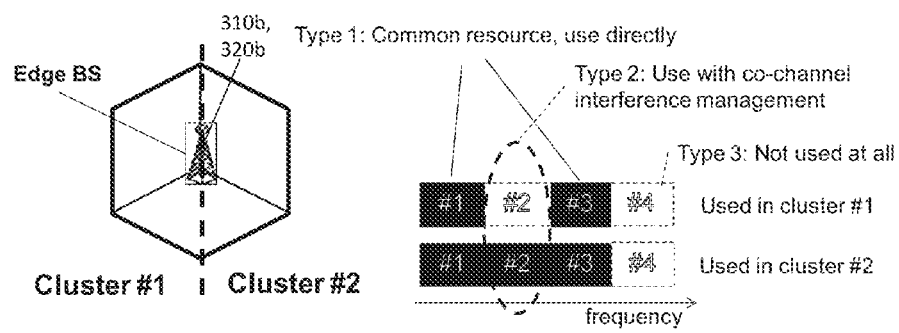
FIG. 6 shows an illustration of the categorization of frequency spectrum fragments into three different types for each edge base station according to embodiments of the present invention.

The handling of spectrum allocation for the edge base stations 310b, 320b is described in the following subsection. For the edge base stations 310b, 320b, the spectrum manager 300 categorizes the spectrum fragments into three different types based on the spectrum partition patterns of all neighboring clusters of an edge base station 310a, 320b, as for example visualized in FIG. 6. A first type (type 1 in FIG. 7) are frequency spectrum fragments without co-channel interference, for example the fragments #1 and #3 in FIG. 6, which are the commonly used frequency spectrum fragments by the corresponding operator in all directly neighboring clusters of the edge base station 310b, 320b. Such frequency spectrum fragments can be used without being effected by co-channel interference. The second type (type 2 in FIG. 6) is frequency spectrum fragments with co-channel interference. These are the frequency spectrum fragments that are used by different operators (including the operator of the concerned edge base station) in different clusters in the direct neighborhood. For example fragment #2 in FIG. 6 is used in cluster #1 as well as in cluster #2 by respective different operators and the different clusters. Such frequency spectrum fragments of the second type can only be used with co-channel interference management. The third type (type 3 in FIG. 6) is unused fragments, as for example the fragment #4 in FIG. 6. These frequency spectrum fragments are commonly not used by the operator of the concerned edge base station in the relevant clusters.

Figure 7:
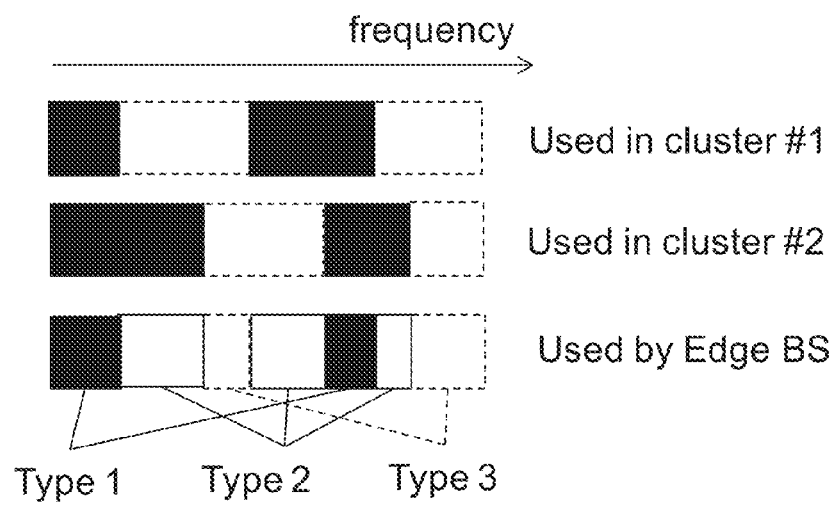
FIG. 7 shows a further example of the categorization of frequency spectrum fragments.
Figure 8:
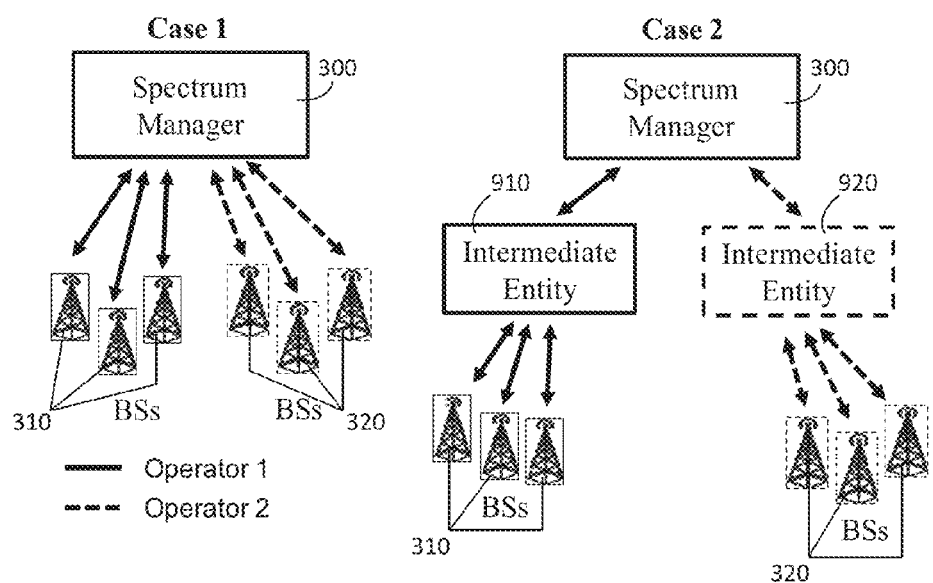
FIG. 8 shows an illustration of two possible implementation scenarios of the signaling between the spectrum manager and the base stations according to embodiments of the present invention.

FIG. 7 shows a further example of the three types of the frequency spectrum fragments for edge base stations 310b, 320b. In the shown case, since the spectrum partition patterns of the neighboring clusters have different structures, the spectrum is further fragmented so that three different types of frequency spectrum fragments as defined above are determined. Hereby, an embodiment of the present invention suggest two options for the spectrum manager 300 to inform the edge base station 310b, 320b about such frequency spectrum fragment types. The first option is that the spectrum manager 300 identifies the different types and informs each edge base station 310b, 320b which respective type each frequency spectrum fragment belongs to. The second option is that the spectrum manager 300 informs each base station 310b, 320b about the spectrum partition patterns in the neighboring clusters and each base station 310b, 320b identifies the types of the frequency spectrum fragments itself. As already briefly mentioned above, there are generally two implementation possibilities of the signaling between the spectrum manager 300 and the base stations 310, 320. The first case is a direct signaling between the spectrum manager 300 and the base stations 310, 320. In this case, the information exchange between the spectrum manager 300 and the base stations 310, 320 is directly without any intermediate entities. This signaling can be implemented in a dedicated signaling connection between each base station and the spectrum manager or a common signaling channel. In the second case, there is an indirect signaling between the spectrum manager 300 and the base stations 310, 320 via one or more intermediate entities 910, 920 as shown in FIG. 8. FIG. 8 generally shows, on the left side, an example for the direct signaling of the first case, and the indirect signaling of the second case as mentioned. In the shown example of the second case, the indirect signaling is done via intermediate entities 910, 920, which belong to individual operators. Intermediate entity 910 belongs to a first operator and communicates with base stations 310 that belong to this operator. Intermediate entity 920 belongs to a different operator and communicates with base stations 320 allocated to this operator. The signaling can be done via the S1 interface or a common signaling channel.

In the following, some more specific implementation examples are given to illustrate the signaling schema and the signaling formats for the above mentioned cases, namely case 1 (direct signaling) and case 2 (indirect signaling). For the case signaling, the following signaling format can be used as an example (sent by the spectrum manager 300 to the base stations 310, 320):

| BS Identity | BS class | Allocated spectrum fragments |
|---|---|---|

Example for an "Inner BS":

| BS Identity code/number | 0 ("Inner BS") | $1^{st}$ allocated fragment identity; $2^{nd}$ allocated fragment identity, . . . |
|---|---|---|

Example for an "Edge BS":

| BS Identity code/number | 1 ("Edge BS") | $1^{st}$ allocated fragment identity, type; $2^{nd}$ allocated fragment identity, type; . . . |
|---|---|---|

For case 2 signaling, the following signaling format can be used as an example (sent by the spectrum manager 300 to the intermediate entity 910, 920) as an example:

| Information related to "Inner BSs" | | |
|---|---|---|
| Cluster ID | List of BS Identities in the cluster | Allocated spectrum |
| Cluster 1 | BS1, BS2, . . . (only those BSs connected to this intermediate entity) | $1^{st}$ allocated fragment identity; $2^{nd}$ allocated fragment identity, . . . |
| Cluster 1 | BS8, BS9, . . . (only those BSs connected to this intermediate entity) | $1^{st}$ allocated fragment identity; $2^{nd}$ allocated fragment identity, . . . |
| . . . | . . . | . . . |
| Information related to "Edge BSs" | | |
| Identity of the $1^{st}$ "Edge BS" connected to this intermediate entity | | $1^{st}$ allocated fragment identity, type; $2^{nd}$ allocated fragment identity, type; . . . |
| . . . | | . . . |

In the above format example, all base stations 310, 320 that are connected to this intermediate entity 910, 920 and that have demand on the shared spectrum should be included.

Afterwards, the intermediate entity can send a message to each BS using the following format:

| BS Identity | BS class | Allocated spectrum fragments |
|---|---|---|

In the above formats, the identity of an allocated fragment can, e.g., include the starting and ending frequency in "Hz" of this fragment, or include the starting and ending subcarrier index which correspond to this fragment, when a multi-carrier based spectrum sharing scheme is used.

In the following, the co-channel interference management performed in the edge base stations 310b, 320b is explained in more detail. If an edge base station 310b, 320b intends to use the second type of frequency spectrum fragments, a co-channel interference management has to be performed. In an embodiment of the present invention, two approaches are suggested for such co-channel interference management, namely a coordinated approach and an uncoordinated approach. The coordinated approach can hereby be done in either a centralized way or in a localized way. For the centralized coordinated approach, the spectrum manager 300 further partitions a second type of frequency spectrum fragments into subfragments and allocates different sets of subband fragments to the respective edge base stations 310b, 320b of different operators. For the localized way, two methods can be used, namely method 1 and method 2. In method 1, each edge base station 310b, 320b negotiates with the neighboring edge base stations 310b, 320b of the other operators, defined as those base stations having overlapping coverage with this negotiating edge base station for the use of the second type of frequency spectrum fragments. This negotiation is done either directly via inter-operator communication or via the spectrum manager 300. After such a negotiation is successfully terminated, a usage plan of such frequency spectrum fragments is established for a certain time interval, within which the concerned edge base stations 310b, 320b use the fragments according to the usage plan. In method 2, each edge base station 310b, 320b informs, i.e., sends information to the neighboring edge base stations 310b, 320b of the other operators, for example via inter-operators signaling or via the spectrum manager 300 before using the second type of frequency spectrum fragments. The information sent to the neighboring edge base stations 310b, 320b can for example include the identity of the used frequency spectrum fragment, the usage time, the location of the transmitter and/or the transmit power and so forth. After an edge base station 310b, 320b has received such information from a neighboring edge base station 310b, 320b of another operator, it will not use the corresponding frequency spectrum fragment during the usage time given in that information.

Figure 9:
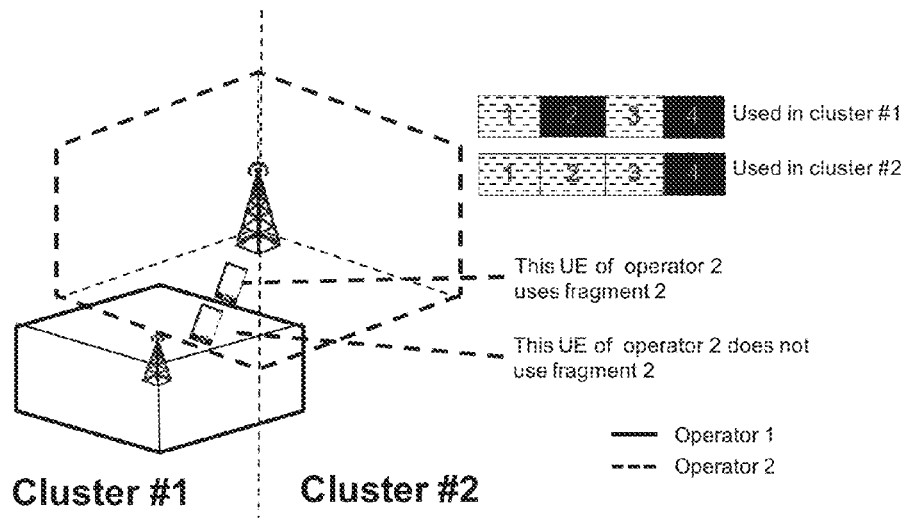
FIG. 9 shows an illustrated example of uncoordinated co-channel interference management.

The uncoordinated approach of co-channel interference management is done as visualized in FIG. 9. Each edge base station 310b, 320b lets its allocated user terminals measure the interference level in the second type of frequency spectrum fragments. Only those user terminals with low interference can use such frequency spectrum fragments. Also, only a low transmit power can be used in such frequency spectrum fragments. Each edge base station 310b, 320b, in this approach, coordinates the use of such frequency spectrum fragments by its user terminals on the basis of the correspondingly received information from the user terminals.

According to an embodiment of the present invention, the spectrum manager 300 may dynamically optimize the cluster size in order to achieve a tradeoff between traffic-spectrum match and overhead for co-channel interference management. Hereby, the following parameters and issues are considered by the spectrum manager 300, namely that large clusters mean less effort to manage co-channel interference of the edge base stations 310b, 320b, but reduced traffic-spectrum matching, and small clusters mean a better traffic-spectrum matching, but an increased effort to manage the co-channel interference of the edge base station 310b, 320b. Therefore, the spectrum manager 300 will try to achieve a good tradeoff between these requirements and parameters.

Figure 10:
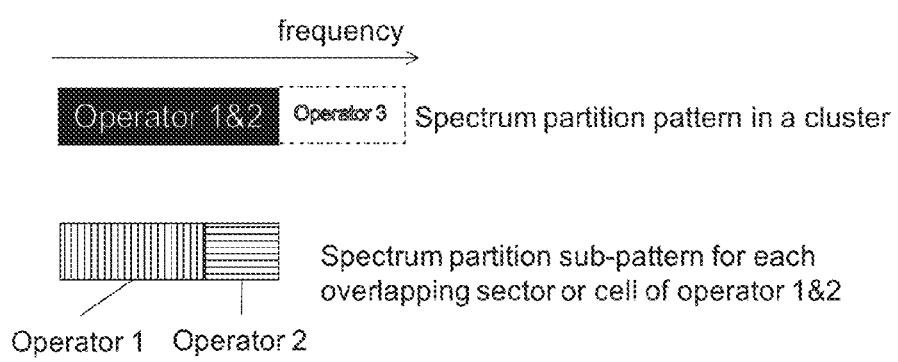
FIG. 10 shows an illustration of an example of spectrum partition sub patterns for operators with ideal network deployment.

As briefly mentioned above, a subgroup of operators having an ideal network deployment are grouped to a virtual operator and will be allocated certain frequency spectrum fragments by the spectrum manager 300. An example for such an allocation of certain frequency spectrum fragments is shown as an example in FIG. 10. From these allocated frequency spectrum fragments from the virtual operator, the spectrum manager 300 further performs a spectrum partitioning, i.e., determines spectrum partition sub-patterns or sub-fragments. Such sub-fragments are determined for each overlapping sector or cell of these subgroups of operators to meet their spectrum demands individually.

The application of the embodiments of the present invention in a heterogeneous network, such as a network with different tiers including macro cell layer, micro cell layer, pico cell layer, etc., is as follows. First, a macro base station 310, 320 can relay the spectrum partition pattern and an indication of the inner base stations 310a, 320a and edge base stations 310b, 320b sent from the spectrum manager 300 to its small cell base stations. Then the macro base station can further partition the allocated spectrum fragments as allocated by the spectrum manager 300 and allocate the further partition fragments to itself and the relevant small cells. With interference management, the macro base stations and the relevant small cell base stations can use the non-orthogonal frequency spectrum fragment.

The present invention has been described in conjunction with various embodiments as examples as well as implementations. However, other variations can be understood and effected by those skilled in the art and practicing the claimed invention, from the study of the drawings, the disclosure and the independent claims. In the claims as well as in the description, the word "comprising" does not exclude other elements or steps and the indefinite article "a" or "an" does not exclude a plurality. A single element or other units may fulfill the functions of several entities or items recited in the claims. The mere fact that certain measures are recited in the mutual difference dependent claims does not indicate that a combination of these measures cannot be used in an advantageous implementation.

What is claimed is:

1. A spectrum manager for allocating a shared frequency spectrum in a wireless communication system having a plurality of base stations for wireless communication with terminals, the plurality of base stations being operated by at least two operators, the spectrum manager configured to:
group the plurality of base stations into clusters based on spectrum demand related information; and
determine a spectrum partition pattern for each cluster based on the spectrum demand related information and information of the grouped based station clusters, a spectrum partition pattern specifying the partition and allocation of frequency spectrum fragments to the at least two operators in a corresponding cluster of the wireless communication system, wherein a frequency spectrum fragment is allocated to only one of the at least two operators in each cluster, and forward information regarding the spectrum partition pattern to the plurality of base stations or to one or a plurality of network entities of the at least two operators;
classify the base stations of each cluster into inner base stations and edge base stations, inner base stations being base stations inside the respective cluster without being affected by co-channel interference, and edge base stations being base stations located in an edge area of the respective cluster being affected by co-channel interference, an edge area of a cluster being the area which overlaps with at least one edge area of a neighboring cluster;

categorize, for each edge base station, the frequency spectrum fragments, into different types of frequency spectrum fragments according to the spectrum partition patterns of all neighboring clusters of each edge base station, wherein said different types of frequency spectrum fragments comprise a first type of frequency spectrum fragments which are used by the operator of the edge base station in the neighboring clusters, a second type of frequency spectrum fragments which are used by different operators, including the operator of the concerned edge base station, in the neighboring clusters and a third type of frequency spectrum fragments which are not used by the operator of the edge base station in the neighboring clusters;

forward, to each edge base station, information about spectrum partition patterns allocated to all neighboring clusters of the respective edge base station in order to enable the edge base stations to classify the fragments of the allocated spectrum partition patterns into different types depending on the spectrum partition patterns allocated to the neighboring clusters; and partition frequency spectrum fragments of the second type into sub-fragments, and allocate the different sub-fragments to the edge base stations of respective different operators.

2. The spectrum manager according to claim 1, further configured to:
dynamically group the plurality of base stations into clusters each time when the spectrum demand related information is updated; or
group the plurality of base stations on demand of request from operators or base stations.

3. The spectrum manager according to claim 1, further configured to:
receive spectrum demand related information from the plurality of base stations or from the network entities of the at least two operators, wherein the spectrum demand related information comprises information regarding the spectrum demand of each of the plurality of base stations and/or the network deployment information of the at least two operators.

4. The spectrum manager according to claim 1, further configured to:
group the base stations into a cluster by putting bases stations with lower spectrum demand in the edge area of the cluster and base stations with higher spectrum demand in the central area of the cluster.

5. The spectrum manager according to claim 1, wherein for the second type of the frequency spectrum fragment a co-channel interference management is to be performed between the involved edge base stations.

6. A wireless communication system comprising:
a spectrum manager for wireless communication with terminals in the wireless communication system, the spectrum manager configured to:
group the plurality of base stations which are operated by at least two operators into clusters based on spectrum demand related information,
determine a spectrum partition pattern for each cluster based on the spectrum demand related information and information of the grouped based station clusters, a spectrum partition pattern specifying the partition and allocation of frequency spectrum fragments to at least two operators in a corresponding cluster of the wireless communication system, wherein a frequency spectrum fragment is allocated to only one of the at least two operators in each cluster, and forward information regarding the spectrum partition pattern to the plurality of base stations or to one or a plurality of network entities of the at least two operators, classify the base stations of each cluster into inner base stations and edge base stations, inner base stations being base stations inside the respective cluster without being affected by co-channel interference, and edge base stations being base stations located in an edge area of the respective cluster being affected by co-channel interference, an edge area of a cluster being the area which overlaps with at least one edge area of a neighboring cluster, categorize, for each edge base station, the frequency spectrum fragments, into different types of frequency spectrum fragments according to the spectrum partition patterns of all neighboring clusters of each edge base station, wherein said different types of frequency spectrum fragments comprise a first type of frequency spectrum fragments which are used by the operator of the edge base station in the neighboring clusters, a second type of frequency spectrum fragments which are used by different operators, including the operator of the concerned edge base station, in the neighboring clusters and a third type of frequency spectrum fragments which are not used by the operator of the edge base station in the neighboring clusters, forward, to each edge base station, information about spectrum partition patterns allocated to all neighboring clusters of the respective edge base station in order to enable the edge base stations to classify the fragments of the allocated spectrum partition patterns into different types depending on the spectrum partition patterns allocated to the neighboring clusters, and partition frequency spectrum fragments of the second type into sub-fragments, and allocate the different sub-fragments to the edge base stations of respective different operators; and at least one base station configured to:
receive information regarding the spectrum partition patterns from said spectrum manager; and
communicate with terminals in the wireless communication system on the basis of said received information regarding the spectrum partition patterns.

7. The base communication system according to claim 6, wherein the at least one base station comprises an edge base station further configured to:
receive information about spectrum partition patterns allocated to the neighboring clusters; and
categorize the frequency spectrum fragments of the allocated spectrum partition patterns into different types depending on the spectrum partition patterns allocated to the neighboring clusters, wherein the different types comprise,
a first type of frequency spectrum fragments which are commonly used by the same operator of the edge base station in respective neighboring clusters,
a second type of frequency spectrum fragments which are used by different operators, including the operator of the edge base station, in respective neighboring clusters, and
a third type of frequency spectrum fragments which are not used by the operator of the edge base station in respective neighboring clusters.

8. The wireless communication system according to claim 7, wherein the at least one base station is further configured to:
negotiate, with respective edge base stations of neighboring clusters, a usage plan for the second type of fragments which are used by different operators, including the operator of the edge base station, in respective neighboring clusters.

9. The wireless communication system according to claim 7, wherein the at least one base station is further configured to:
transmit, to respective edge base stations of neighboring clusters, its usage parameters for the second type of fragments which are used by different operators, including the operator of the edge base station, in respective neighboring clusters.

10. The wireless communication system according to claim 7, wherein the at least one base station is further configured to:
let its allocated terminals determine co-channel interference level in the second type of fragments, and to allocate resources in said second type fragments only to terminals with low co-channel interference.

11. A method for allocating shared frequency spectrum to operators in a wireless communication system for wireless communication with terminals in the wireless communication system, wherein the wireless communication system comprising a plurality of base stations being operated by at least two operators, the method comprising:
grouping said plurality of base stations into clusters on the basis of spectrum demand related information; and
determining a spectrum partition pattern for each cluster based on the spectrum demand related information and information of the grouped based station clusters, a spectrum partition pattern specifying the partition and allocation of frequency spectrum fragments to said at least two operators in a corresponding cluster of said wireless communication system, wherein a frequency spectrum fragment is allocated to only one of said at least two operators within each cluster;
forwarding information regarding the spectrum partition pattern to the plurality of base stations or to one or a plurality of network entities of the at least two operators;
classifying the base stations of each cluster into inner base stations and edge base stations, inner base stations being base stations inside the respective cluster without being affected by co-channel interference, and edge base stations being base stations located in an edge area of the respective cluster being affected by co-channel interference, an edge area of a cluster being the area which overlaps with at least one edge area of a neighboring cluster;
categorizing, for each edge base station, the frequency spectrum fragments, into different types of frequency spectrum fragments according to the spectrum partition patterns of all neighboring clusters of each edge base station, wherein said different types of frequency spectrum fragments comprise a first type of frequency spectrum fragments which are used by the operator of the edge base station in the neighboring clusters, a second type of frequency spectrum fragments which are used by different operators, including the operator of the concerned edge base station, in the neighboring clusters and a third type of frequency spectrum fragments which are not used by the operator of the edge base station in the neighboring clusters;
forwarding, to each edge base station, information about spectrum partition patterns allocated to all neighboring clusters of the respective edge base station in order to enable the edge base stations to classify the fragments of the allocated spectrum partition patterns into different types depending on the spectrum partition patterns allocated to the neighboring clusters; and
partitioning frequency spectrum fragments of the second type into sub-fragments, and allocate the different sub-fragments to the edge base stations of respective different operators.

* * * * *